July 15, 1941.　　W. S. BRINK　　2,248,952
RIM SIDE RING
Filed April 9, 1940　　2 Sheets-Sheet 1

INVENTOR
Winfield S. Brink
BY
ATTORNEYS

July 15, 1941.   W. S. BRINK   2,248,952
RIM SIDE RING
Filed April 9, 1940   2 Sheets-Sheet 2

INVENTOR
Winfield S. Brink
BY
ATTORNEYS

Patented July 15, 1941

2,248,952

UNITED STATES PATENT OFFICE 2,248,952

RIM SIDE RING

Winfield S. Brink, Akron, Ohio, assignor to The Firestone Tire and Rubber Company, Akron, Ohio, a corporation of Ohio Application April 9, 1940, Serial No. 328,629

12 Claims. (Cl. 152—406)

The present invention relates to rim side rings, especially of the type used in connection with rim bases having a rim side ring receiving gutter formed therein at one margin thereof.

In present type rim constructions one form of rim comprises a cylindrical rim base which has an integral tire retaining flange formed at one margin of the rim base. At the opposite margin of the rim base a rim side ring receiving gutter is formed with an endless metal side ring being provided to be received in this rim side ring receiving gutter. The side ring is of such construction and has diametrically opposed portions thereof formed of larger diameter than the remainder of the rim side ring whereby the rim is adapted to be sprung into the rim side ring receiving gutter formed in the rim base. This side ring is retained in the rim base due to the fact that the normal diameter of the rim side ring is less than the outer diameter of the rim side ring receiving gutter of the rim base whereby once the side ring is sprung into the rim gutter it retains itself therein.

This construction is very satisfactory for most wheels but is not entirely satisfactory for relatively small and relatively large diameter wheels in that the diameter of the side ring and/or the section of the rim side ring for such wheels does not lend itself to ready use of a continuous side ring.

Heretofore, several types of split side rings have also been used. These rings have usually been planar and had the ends of the metal strip forming same unsecured whereby the ring could easily be sprung into position. However, the ends of these rings are deflected on each rotation of the wheel as load is applied thereto and this causes rapid failure of the side ring. Movement of the side ring also permits movement of the tire carried by the rim and produces breaks in the side wall of the tire carcass.

The general object of the present invention is to provide a novel type of rim side ring for use in the above type of rim construction.

Another object of the invention is to provide a sturdy, uncomplicated rim side ring which is readily formed from any suitable strip material.

The above and further objects will be manifest from the following specification.

The present invention is described with particular reference to the accompanying drawings, in which.

Figure 1:
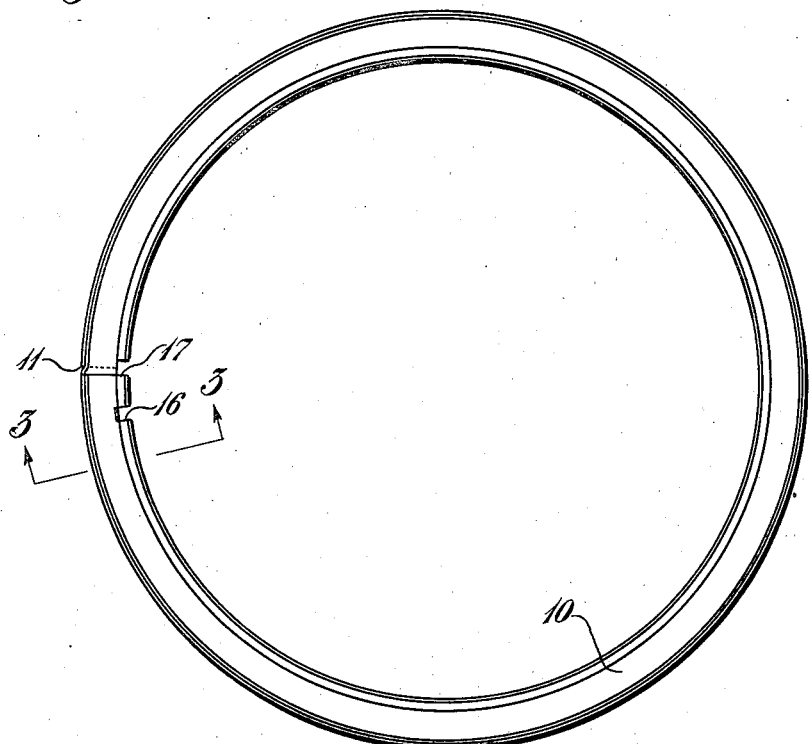
Figure 1 is an elevation of one embodiment of the present invention.
Figure 2:
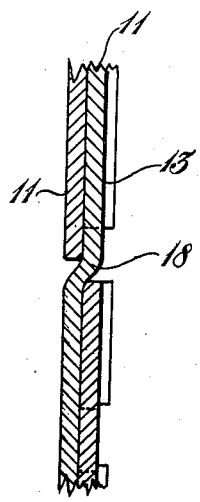
Figure 2 is a fragmentary horizontal sectional elevation on line 2—2 of Figure 3.
Figure 3:
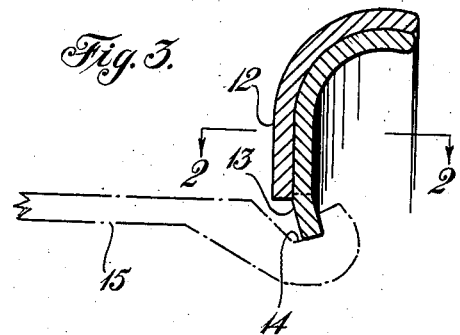
Figure 4:
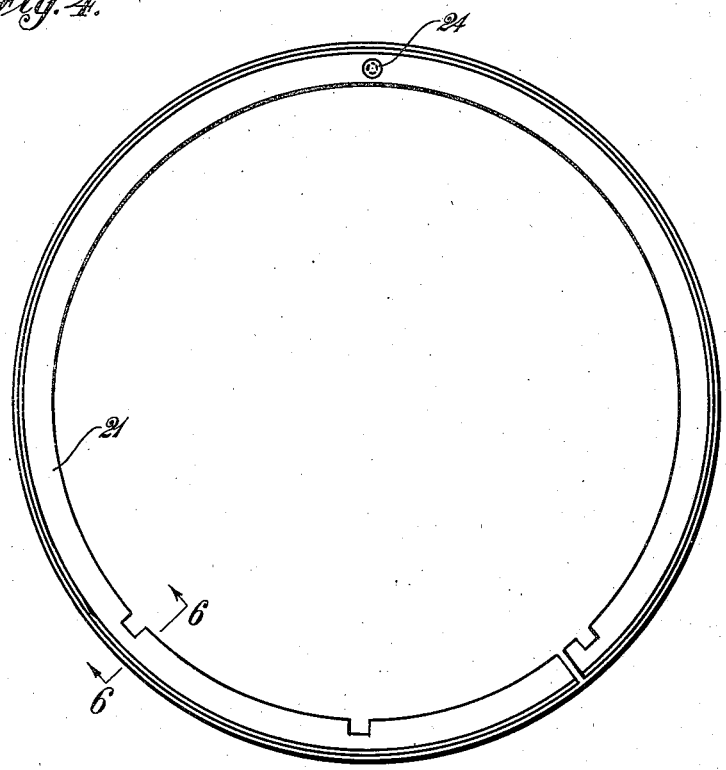
Figure 5:
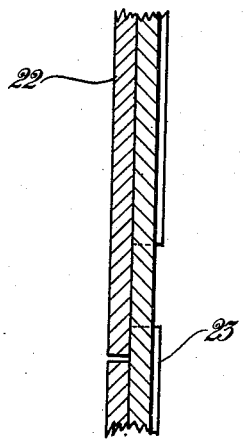
Figure 6:
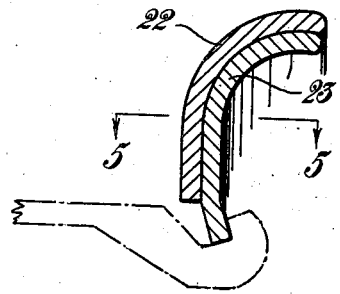

Figure 3 is a vertical sectional elevation on line 3—3 of Figure 1, the rim with which the rim side ring is associated being shown in dotted lines; and Figures 4, 5, and 6 are elevations similar to Figures 1, 2 and 3, respectively, of a modification of the invention.

With particular reference to the specific construction shown in Figure 1, it is seen that this comprises an annular rim side ring generally indicated 10. This rim side ring is formed from a continuous metal strip 11 that is rolled or otherwise formed into two laterally contacting annular convolutions, or rings 12 and 13, the matter of which has a smaller diameter than the ring 12. The radially inward portion of the ring 13 is provided as a locking member, or engaging portion which is adapted to be engaged with a rim side ring receiving gutter 14 formed in a standard rim base 15 (see Figure 3). Figure 2 best shows that the ends of the metal strip 11 are unsecured, and hence free for movement whereby the diameter of the rings 12 and 13 can be varied. The metal strip 11 is formed of a springy material so that the rings 12 and 13 have a normal diameter of the desired size, which diameter can be varied by exerting force upon the metal strip 11 whereby the effective diameter of the rim side ring can be temporarily varied to permit the rim side ring to be snapped into and out of position onto the rim base 15. Tool receiving slots 16 and 17 are formed in the inner portion of the ring 13 to aid in snapping it into position on the rim base. An angular portion 18 is formed in the metal strip 11 where the metal strip changes over from the ring 12 to the ring 13, with the tool slot 17 being formed in this portion of the ring 13. Note that the lower portions of each of the rings 12 and 13 are in substantially vertical planes but that the radially outward portions of the rings are rolled or otherwise bent over whereby a tire retaining flange is formed on the rim side ring. This rolled over outer edge of the rings 12 and 13 is also important because it aids in transferring a force applied to the ring 13 to the ring 12 to spring the rim side ring into or out of position on a rim base.

In the modification of the invention shown in Figures 4 through 6, there is shown a split type side ring 21, generally similar to that shown in Figures 1 through 3, which comprises two separate split annular members 22 and 23 which are formed from springy metal strip. The members 22 and 23 are split and the ends thereof are free for movement. The annular members are held in fixed relation and in lateral contact by a rivet, or other similar means, 24, extending therethrough in a local region thereof, which positions the members with the ends thereof in staggered relation. Hence the members 22 and 23, in effect form a continuous annular member having unsecured ends whereby the diameter of the member can be temporarily varied by applying a force thereto. Note that one member supports the free ends of the other member and vice versa when a laterally directed force is applied to the ring 21 adjacent the split portions thereof.

It will be observed that the present invention provides rim side rings of relatively simple construction, which can be easily and inexpensively formed from elongate metal members. These side rings are of sturdy construction and are adapted to stand the rough treatment to which rim side rings are subjected. Obviously the rim side rings are formed from relatively heavy material whereby they retain the diameter given them and require an appreciable force to move their free ends with relation to the remainder thereof. This prevents any undesired springing of the rim side rings out of engagement with the rim receiving gutter of the rim base.

While a written description and illustration of two embodiments of the invention are disclosed herein, it will be understood that modifications thereof can be made without departing from the scope of the invention as defined in the appended claims.

What is claimed is:

1. A rim side ring comprising a resilient metal strip formed into two laterally contacting rings each of which is in a plane, the two rings being joined by an offset portion in said strip, one of said rings being of smaller diameter than the second of said rings and being adapted to engage with a side ring receiving gutter formed in a rim, said smaller diameter ring having tool receiving slots formed therein at the inner periphery thereof, the ends of said strip being substantially laterally adjacent in the rim side ring and being free to move with relation to each other whereby the normal diameter of said rings can be varied by applying a force thereto.

2. A rim side ring comprising a metal strip formed into two laterally contacting rings each of which is in a plane, the two rings being joined by an offset portion in said strip, at least one of said rings having a tool receiving slot formed therein to aid in positioning the rim side ring, the ends of said strip being free to move with relation to each other whereby the normal diameter of said rings can be varied by applying a force thereto.

3. A rim side ring comprising a metal strip formed into two laterally contacting rings each of which is in a plane, the two rings being joined by an offset portion in said strip, one of said rings being of smaller diameter than the second of said rings and being adapted to engage with a side ring receiving gutter formed in a rim, said smaller diameter ring having a tool receiving slot formed therein at the inner periphery thereof.

4. A rim side ring comprising a resilient metal strip formed into two laterally adjacent annular convolutions in which said strip is substantially vertical in the lower portion thereof and turned over to substantially horizontal position in the outer portion thereof, one of said convolutions being positioned radially inwardly of the other convolution, the ends of said strip being free to move with relation to said convolutions, the inner edge of the radially inner of said convolutions being adapted to engage with a rim and having tool receiving slots formed therein whereby a force can be applied to that convolution to aid in springing the rim side ring into or out of position on a rim base.

5. A rim side ring comprising an annular metal strip having two laterally adjacent convolutions formed therein with the ends of said strip being free to move relative to the convolutions whereby the diameter of same may be varied.

6. A rim side ring which comprises two laterally adjacent substantially continuous annular metallic rings which combine to form a continuous annular member and which have at least two free ends whereby the diameter of the member can be varied.

7. A rim side ring which comprises two laterally contacting, springy metallic annular members which have at least two unsecured ends in staggered annular relation, said annular members combining to form a continuous ring the diameter of which can be varied by changing the positions of said unsecured ends by forces applied to said annular member.

8. A rim side ring which comprises two laterally contacting annular members formed of springy metal strip, each of said members having an unsecured end which is in staggered annular relation to the unsecured end of the other of said annular members, each of said annular members being adapted to position the other against lateral forces applied thereto adjacent the free end thereof.

9. A rim side ring comprising two split annular metal members, and means securing said members together in lateral contact, said members being positioned with the splits thereof in staggered relation.

10. A rim side ring which comprises two laterally adjacent split annular rings and a pin securing said rings together, the ends of said rings being in staggered relation whereby said rings combine to form a continuous annular member the diameter of which can be varied.

11. A rim side ring which comprises two laterally adjacent substantially continuous annular metallic rings which combine to form a continuous annular member, each of said rings having at least one free end whereby the diameter of said continuous annular member can be varied.

12. A rim side ring comprising an annular metal strip having two laterally adjacent convolutions formed therein, one end of said strip being present in each of said convolutions and being free to move whereby the diameter of said convolutions can be varied.

WINFIELD S. BRINK.